United States Patent [19]

van de Leemput et al.

[11] 4,435,314

[45] Mar. 6, 1984

[54] PROCESS OF PREPARING A POLYMERIZATION CATALYST AND PREPARATION OF ETHYLENE POLYMERS WITH THIS CATALYST

[75] Inventors: Lambertus J. M. A. van de Leemput, Echt; Godefridus A. H. Nooijen, Helden-Panningen, both of Netherlands

[73] Assignee: Stamicarbon B.V., Geleen, Netherlands

[21] Appl. No.: 405,374

[22] Filed: Aug. 5, 1982

[30] Foreign Application Priority Data

Aug. 6, 1981 [NL] Netherlands .......................... 8103703

[51] Int. Cl.$^3$ ........................... C08F 4/64; C08F 4/70; C08F 4/62
[52] U.S. Cl. .................................... 502/154; 526/114; 526/115; 502/170
[58] Field of Search ............... 252/429 B, 429 C, 430, 252/431 R, 431 C

[56] References Cited

U.S. PATENT DOCUMENTS

| | | | |
|---|---|---|---|
| 3,855,324 | 12/1974 | Mertzweiller et al. | ..... 252/429 C X |
| 4,041,224 | 8/1977 | Hoff et al. | ........................ 252/430 X |
| 4,146,695 | 3/1979 | van de Leemput | ............ 252/430 X |
| 4,184,979 | 1/1980 | Kirch et al. | .......................... 252/430 |
| 4,209,603 | 6/1980 | van de Leemput | ............ 252/430 X |
| 4,305,841 | 12/1981 | Gutweiler | ........................... 252/430 |
| 4,321,159 | 3/1982 | Bressler et al. | ............. 252/429 C X |

*Primary Examiner*—Patrick Garvin
*Attorney, Agent, or Firm*—Cushman, Darby & Cushman

[57] ABSTRACT

Disclosed is a catalyst comprising an inert, particulate, inorganic support onto which has been deposited a group II or III metal hydrocarbyl complex of chromium and at least one additional complex or compound of a transition metal selected from the group consisting of nickel, molybdenum, and titanium. The catalyst is activated by heating in the range 200° C.–1200° C. Also disclosed is the process for the polymerization of α-olefins in the presence of said catalyst.

7 Claims, No Drawings

PROCESS OF PREPARING A POLYMERIZATION CATALYST AND PREPARATION OF ETHYLENE POLYMERS WITH THIS CATALYST

BACKGROUND OF THE INVENTION

This invention relates to a process for preparing a chromium-containing catalyst for the polymerization of olefins, comprising applying to an inert inorganic support a chromium complex of one or more organometallic compounds of a metal of group II or III of the periodic table in which hydrocarbyl groups having 1-20 carbon atoms are bonded to this metal.

The invention relates also to the polymerization with such a catalyst of an α-olefin having 2-8 carbon atoms, in particular ethylene, and optionally including up to 15 mole % of one or more other α-olefins having 2-15 carbon atoms.

Such processes are known from U.S. Pat. No. 4,146,695, and are described in the co-pending Application Ser. No. 320,563 filed Nov. 12, 1981.

Additionally, from U.S. Pat. No. 3,951,933 and from the Russion Pat. Nos. 269,151 and 433,172 it is known to add nickel oxide to chromium-oxide-containing catalysts, either to prevent the formation of unsaturation in the polymers or copolymers obtained or to obtain polymers of lower density by dimerization of the monomer.

Polymerizations of olefins, and in particular ethylene, according to known processes, can be carried out as a 'solution process', a 'suspension process' or a 'gas-phase process', to yield polymers of relatively high density. The polymers obtained with known chromium-containing catalysts have generally been found to exhibit a relatively wide molecular weight distribution. However, for certain applications it is desirable to obtain polymers having high density, but having the narrowest possible molecular weight distribution. This is notably the case for applications such as injection molding of polyethylene.

SUMMARY OF THE INVENTION

It has now been found that a chromium-containing catalyst component, which upon activation with heat at a temperature of from 200° C. to 1200° C. will effect the polymerization of alpha-olefins, and yielding polymers of narrow molecular weight distribution can be obtained by the process comprising depositing from solution on an inert, particulate, inorganic support the following materials:

(a) a first component which is a chromium complex comprising the reaction product of:
  (1) a transition metal complex which is the reaction product of:
  (2) a group II or III metal hydrocarbyl compound wherein the hydrocarbyl group contains 1-20 carbon atoms; and
(b) at least one second component selected from the group consisting of:
  (1) a transition metal complex which is the reaction product of:
    (a) a transition metal compound wherein the metal is selected from the group consisting of nickel, molybdenum, and titanium, and
    (b) a group II or III metal hydrocarbyl compound wherein the hydrocarbyl groups contain 1-20 carbon atoms, and
  (2) a transition metal alkoxide or alkyl carboxylate wherein the metal is selected from the group consisting of nickel, molybdenum, and titanium.

Whenever the term 'catalyst' is stated in the specification or claims, it is intended to denote the combination of support and metal compounds and/or complexes bonded thereto, whether heat activated or not, though the term 'catalyst component' is intended to denote specifically the non-heat activated products. Moreover, although chromium is a transition metal, for the sake of simplicity the term "transition metal" is used in this specification and in the claims to refer to the group of metals: molybdenum, nickel, and titanium. Also, the term "complex" as used in this specification and in the claims denotes the complex of metal which has been reacted with a group II or III element hydrocarbyl compound, as set forth above. The term "metal compound" denotes a metal compound that is not the complex product of a reaction involving a group II or III element hydrocarbyl reactant. Examples of such metal compounds would be chelates, mineral acid salts, and carboxylic acid salts.

Surprisingly, with the catalysts of the present invention it has now been found to be much easier to control the molecular weight distribution of polymers obtained than it is using known catalysts, and in particular it has been found to be possible to obtain polymers of high density and narrow molecular weight distribution.

DETAILED DESCRIPTION

The chromium compound is complexed with hydrocarbyl group-containing organometallic compounds of Group II or III elements of the periodic table, such as beryllium, magnesium, boron, aluminum and gallium. The hydrocarbyl groups in these compounds are preferably alkyl groups having 1-20 carbon atoms.

Suitable starting chromium compounds are, for example 1,3-diketo compounds such as chromium(III) acetylacetonate, chromium salts of mineral acids, or chromium salts of saturated or unsaturated aliphatic carboxylic acids such as propanoic, hexanoic, octanoic, decanoic, lauric, myristic, palmitic, stearic, arachic, oleic, erucic, perlargonic, linoleic and linolenic acid.

Suitable group II and III organometallic compounds are in particular aluminum trialkyls and magnesium dialkyls. The alkyl groups in the magnesium dialkyls may contain 2-12 carbons atoms, preferably 4-8 carbon atoms. Suitable organomagnesium compounds are diethyl, dipropyl, diisopropyl, ethylbutyl, dibutyl, diisobutyl, diamyl, dihexyl, dioctyl, didecyl, and didodecyl magnesium. Also suitable are dicycloalkyl magnesium compounds wherein the cycloalkyl groups, may independently contain 3-12 carbon atoms, preferably 5 or 6 carbon atoms. Additionally, an alkyl and a cycloalkyl group may be bonded to magnesium. Although alkyl or cycloalkyl magnesium compounds are preferred, magnesium aryls may also be used, in particular diphenyl magnesium, but also ditolyl and dixylyl magnesium. The organomagnesium compounds may be prepared in any known manner (see e.g. Organometallic Compounds; vol. 1; G. E. Coates; M. L. H. Green and K. Wade: Organometallverbindungen; F. Runge). In particular, use is made of solutions of magnesium alkyls prepared according to the process described in Dutch Pat. No. 139,981.

Suitable aluminum compounds are aluminum trialkyls and organoaluminum compounds having the general formula $(R_4)_2AH$, where $R_4$ denotes an alkyl group having 1-10 carbon atoms. Aluminum compounds containing one or more radicals derived from a diene, as known from, for example, GB No. 1,332,493 and U.S. Pat. No. 3,180,837 and U.S. Pat. No. 3,149,136 may also be used.

The chromium compounds are reacted with an organomagnesium, organoaluminum, or other organometallic compound of group II or III in a solvent which is inert relative to these compounds. It is preferred to carry out this reaction in a hydrocarbon solvent, particularly in one or a mixture of linear or branched aliphatic hydrocarbons such as butane, pentane, hexane, heptane, octane, decane, or the branched isomers thereof, or in a low-boiling gasoline consisting mainly of hexanes and/or heptanes, or a higher-boiling gasoline. Higher linear or branched saturated aliphatic hydrocarbons or mixtures thereof can also be used as a solvent. Although the chromium compounds dissolve more readily in aromatic hydrocarbons than in aliphatic hydrocarbons, and can be reacted with magnesium diaryls that are soluble to any appreciable extent only in aromatic hydrocarbons, it is generally desirable not to use aromatic hydrocarbon solvents if yields from the process are available in aliphatic and/or cycloaliphatic solvents, in view of the higher cost of aromatic hydrocarbon solvents and also because of possible dangers to health.

Most chromium compounds will be dispersed in the solvent because of their inherent low solubility in aliphatic and/or cycloaliphatic hydrocarbons. Dissolution can be promoted by gentle heating, e.g. at 40°–100° C. or, if low-boiling solvents are used, at the boiling point of the solvent (under pressure, if desired), but initially the chromium compounds will only slightly color the hydrocarbon solvent. However, addition of the organomagnesium or organoaluminum compound will yield dark-colored solutions, as it reacts with the chromium compound and the product goes into solution.

The ratio of the group II or III organometallic compounds used to the chromium compounds used, expressed as the mole ratio of element of group II or III to the chromium, is between 0.5:1 and 20:1, preferably between 1:1 and 9:1.

In order to bring the nickel, molybdenum and/or titanium compound into solution, the compound can be complexed with group II or III organometallic compounds in the manner described above for the chromium compounds, or use can be made of compounds which are soluble as is in the solvent from which the compound is deposited onto the inert support.

Suitable complexable nickel, molybdenum and titanium compounds are 1,3-diketo compounds such as nickel(II) acetylacetonate, molybdenyl acetylacetonate, titanium isopropoxyacetylacetonate, and the metal salts of mineral acids or saturated or unsaturated aliphatic carboxylic acids. Suitable nickel, molybdenum and titanium compounds soluble as is in the preferred solvents are the alkoxides and carboxylic acid salts, examples of which are nickel di-2-ethylhexanoate and tetrabutoxytitanium.

Besides the compounds of chromium and nickel, molybdenum and/or titanium, which are essential for the catalyst of the invention, other transition metals can also be applied to the inert support, as complexes or compounds soluble in the solvents used.

The chromium complex, the nickel, molybdenum, and/or titanium complex, and the optional compounds or complexes of other metals can be prepared as separate solutions which can be applied to the support serially or which can be mixed so that a joint application can be made. Alternatively, a solution of desired complexes can be prepared initially in a common vessel and then jointly applied to the support, bypassing any steps involving the preparation of separate solutions. The solutions are combined with the inert support by being added slowly and with stirring to the support suspended in a solvent. The complexes and compounds can be deposited on the support by evaporation of the solvent if the complexes do not absorb directly from solution. It is easily determined whether the complexes have adsorbed onto the support by simply noting whether the solvent has lightened as the support has become colored.

The inert inorganic support is preferably an oxide, such as silica, alumina, mixed alumina-silica, zirconium oxide, thorium oxide, or magnesium oxide. Among these oxides, silica, alumina and mixed silica-alumina are preferred, with silicia being most preferred. Silica is known as an adsorbent and can be used in many different forms. Particularly suitable are silica xerogels with large pore volumes. If desired, the silica can during or after its preparation be provided in a known manner with other components, such as fluorine. Moreover, such components can be applied during or after activation of the catalyst.

The support is dried, insofar as necessary, by heating in dry air before the transition metals have been deposited on it. Drying should be effected in such a way that the support is free of physically bound water.

The total amount of chromium, nickel, molybdenum and/or titanium, and optional other transition metals applied to the support may vary within wide limits but will generally be in the range of 0.01–10% by wt. of the catalyst.

The atomic ratio of the chromium to the other transition metals in the catalyst may vary within wide limits. Generally, the ratio of chromium:other transition metals will be chosen between 1:50 and 50:1. Preferably, the ratio will be between 1:20 and 20:1.

After all solutions of appropriate compounds and complexes have been combined with the support to form the catalyst, the catalyst is separated from the solvent by filtration or evaporation. If the complexes and/or compounds of the metals have not been deposited on the support to a considerable extent, as will be apparent if the solvent has retained all or substantially all of its color, the solvent should be evaporated.

The catalyst can be activated by heating it at a temperature of 200°–1200° C. in a non-reducing atmosphere, such as oxygen, air, nitrogen, carbon dioxide or a noble gas. It is preferred to conduct this heat treatment in an oxidizing atmosphere, such as oxygen, oxygen-containing gases or air, including air of reduced or increased oxygen content. The supported metal compounds are heated preferably at 400°–1200° C., and most preferably at 500°–1100° C. The heating times may vary in duration from a few seconds to tens of hours or more. At temperatures of 500°–1000° C., however, the heating time will generally range between 30 minutes and 8 hours.

An optimum heating period can easily be determined experimentally by preparing catalysts having identical composition under identical conditions except for the heating period, which is varied. The optimum heating period may then be determined by correlation with desired polymer properties.

To conduct a polymerization, the catalyst after cooling to ambient temperature is introduced into a hydrocarbon solvent which is preferably the polymerization medium. This solvent can be an aliphatic or cyclic hydrocarbon, such as butane, isobutane, normal or branched pentanes, hexanes, heptanes, octanes and higher linear and/or branched saturated aliphatic hydrocarbons, cyclopentane, cyclohexane, cycloheptane, cyclooctane etc. and mixtures. In particular, fractions obtained directly or indirectly from mineral oil, such as low-boiling gasoline, kerosine or gas oil, which may contain aromatics but which predominantly consists of aliphatics and/or cycloaliphatics are well suited. Additionally, aromatic hydrocarbons, such as benzene, toluene, xylenes or halogenated hydrocarbons can also be used, but due to practical considerations such as cost and health risks, it will generally be preferred to use aliphatic hydrocarbons or mineral oil fractions which contain little or no aromatics.

To the supported catalyst dispersed in the organic solvent, an organometallic compound of an element of group II or III of the periodic system, such as beryllium, magnesium, boron, aluminum or gallium, may be added. The mole ratio of this organometallic compound to the total amount of transition metals applied to the support can vary within wide limits, for example, between 0.1:1 and 200:1. Preferably, the ratios lie between 1:1 and 40:1.

The extent to which the addition of such organometallic compounds is desirable depends on the polymerization conditions and on the polymer desired. At low catalyst concentrations and at relatively low monomer concentrations in the solvent, the polymerization can often be started and sustained if such organometallic compounds are added. The contaminant levels in the monomer and solvent also play a role. By experiment it can easily be determined whether the addition of said organometallic compounds is desirable. By addition of organometallic compounds it is also possible to modify the properties of the α-olefin to be polymerized.

Suspension polymerizations with the catalysts of the invention are generally carried out at temperatures of at most 100° C. In some volatile solvents, such as, for example, isobutane, the suspension polymerization can be carried out at even slightly higher temperatures, to about 110° C. Preferably, however, polymerization is conducted at temperatures not exceeding 105° C. The polymerization can be carried out at about 50° C., but temperatures of at least 70° C., and preferably in the range of 85° C. or higher, are chosen.

Ethylene polymerizations using the catalysts of the invention can be carried out also at temperatures above 120° C., for example 150°-200° C. A solution of ethylene polymer in the solvent is then obtained, which can be worked up in any known manner. The polymerization can also be carried out as a so-called gas-phase polymerization, embodiments of which are known from, for example, U.K. Patent Specification No. 1,373,982. When ethylene is copolymerized with at most 15 mole % of one or more alkenes with 3–15 carbon atoms, it has to be taken into account that the polymerization rate of ethylene is higher than that of the comonomers. In order to copolymerize ethylene with a particular mole percentage of comonomer, more, sometimes even considerably more of that comonomer will have to be present in the reaction mixture. One of ordinary skill in the art is familiar with this and will not have much trouble in determining the proportions in the reaction mixture required in order to achieve a particular monomer content in the copolymer.

The polymerization can be carried out at atmospheric pressure, but also at elevated pressure. If low-boiling solvents are used, such as butane, isobutane, pentane, the pressure in the reactor will have to be above atmospheric. The monomer pressure can be atmospheric, but is preferably higher as well. By carrying out the polymerization at elevated monomer pressure, higher yields can be obtained, such that elevated pressures up to 10 MPa will normally be used. Higher pressures, even those up to 200 MPa or more, are possible but are not usually employed for practical reasons.

Preferably, polymerization is carried out at total pressures between 600 and 8000 kPa, particularly between 1200 and 5000 kPa. The pressure selected will in part depend on the polymerization temperature and the volatility of the solvent. The monomer pressure will in part be determined by balancing, on the one hand, the cost and safety aspects of an installation for relatively high pressures against, on the other hand, the polyethylene production level at high versus low pressures. The factors determining the final choice of monomer pressure are therefore economic.

The quantity of catalyst is generally chosen so that the solvent contains 0.001–10 mmoles of transition metals per liter of solvent, and preferably 0.001–1 mmol/l.

The process lends itself to known modifications. For example, the molecular weight may be controlled not only through temperature adjustment but also through the addition of hydrogen or other modifying agents commonly used for this purpose.

The invention will be further explained by the following examples but is not restricted to them.

EXAMPLE 1

Preparation of chromium/nickel catalyst

A. Preparation of Ni(acac)$_2$/TIBA complex

In a thoroughly dried 250 ml flask provided with a stirrer, a dropping funnel and a reflux cooler, 10 g nickel(II) acetylacetonate is suspended in 100 ml dry gasoline, under an atmosphere of dry nitrogen. The suspension is heated to the boiling point, with stirring, whereupon 88.2 ml of a 3.97 molar solution of triisobutylaluminum (TIBA) is added dropwise. A strongly exothermic reaction takes place, during which formation of gas is observed. The reaction is continued for 1 hour at reflux temperature. The complex-solution obtained is dark brown in colour and contains only traces of precipitate. Before being processed further, the solution is first filtered off.

B. Preparation of Cr(acac)$_3$/TIBA-complex

In the same way as in 1A, a complex of Cr(acac)$_3$ and TIBA is made, starting from 15 g Cr(acac)$_3$ suspended in 50 ml dry gasoline and 31.5 ml of a 3.97 M TIBA solution.

C. Application of the chromium(III) acetylacetonate/TIBA nickel(II) acetylacetonate/TIBA complexes To the silica support 24 g silica support is predried for 4 hours at 200° C., dry air being passed through. After the air has been replaced by nitrogen, the silica support is suspended in approx. 100 ml dry gasoline in a 250 ml flask. To this suspension, a mixture of 6.40 ml of the solution of the Ni(acac)$_2$/TIBA complex obtained and filtered off according to example 1A and 2.05 ml of the solution of the Cr(acac)₃/TIBA complex prepared and filtered according to 1B are added dropwise, at room temperature and with vigorous stirring. Stirring is continued for 1 hour. The gasoline is removed by evaporation. The catalyst thus prepared is activated by heating for 8 hours at 900° C., dry air being passed through.

EXAMPLE 2

A. Preparation of MoO₂ (acac)₂/TIBA complex

In the same was as in 1A, a complex of MoO₂(acac)₂ and TIBA is made, starting from 12.94 g MoO₂(acac)₂ suspended in 100 ml dry gasoline and 60 ml 3.97 M TIBA.

B. Application of the chromium(III) acetylacetonate/TIBA complex and molybdenyl(VI)acetylacetonate/TIBA complexes to the silica support 25.1 g silica support is predried for 4 hours at 200° C., dry air being passed through. After the air has been replaced by nitrogen, the silica support is suspended in 150 ml dry gasoline in a 250 ml flask. At room temperature and with vigorous stirring, a mixture of 1.05 ml of the solution of the MoO₂(acac)₂/TIBA complex prepared and filtered according to example 2A and 3.70 ml of the solution of the Cr(acac)₃/TIBA complex prepared and filtered according to example 1B are added to this suspension dropwise. Stirring is continued for 1 hour. The gasoline is removed by evaporation. The catalyst thus prepared is activated by heating for 8 hours at 900° C., dry air being passed through.

EXAMPLE 3

A. Preparation of TiO(acac)₂/DBM complex

In the same way as in 1A, a complex of TiO(acac)₂ and dibutylmagnesium containing 10% triethylaluminum (TEA) is made, starting from 3.275 g TiO(acac)₂ suspended in 50 ml dry gasoline and 107 ml 0.35 M DBM.

B. Preparation of Cr(acac)₃/DBM complex

In the same manner as example 1A, a complex of Cr(acac)₃ and dibutylmagnesium (containing 10% TEA) is made, starting from 0.67 g Cr(acac)₃ suspended in 50 ml dry gasoline and 33.0 ml 0.35 M DBM.

C. Application of the chromium(III) Acetylacetonate/DBM and Titanylacetylacetonate/DBM complexes To the silica support 20 g silica support is predried for 4 hours at 200° C., dry air being passed through. After the air has been replaced by nitrogen, the silica support is suspended in approx. 100 ml dry gasoline in a 1 liter flask. At room temperature and with vigorous stirring, the solution of the Cr(acac)₃/DBM complex prepared according to example 3B, followed by the solution of the TiO(acac)₂/DBM complex prepared according to example 3A, are added to this suspension dropwise. Stirring is continued for 1 hour. The gasoline is removed by evaporation. The catalyst thus prepared is activated by heating for 8 hours at 750° C., dry air being passed through.

EXAMPLE 4

Polymerization with a chromium/nickel catalyst

Into a stirred autoclave (3.2 liters), 1500 ml dry gasoline is introduced, to which 100 mg of the catalyst prepared in Example 1C is subsequently added. Next, 0.4 ml of a 0.5 M trioctylaluminum (TOA) solution in gasoline is added, whereupon the reactor is closed and pressurized with ethylene with 10 vol. % of hydrogen. The contents of the autoclave are heated to 88° C., and polymerization is carried out for 90 minutes at a total pressure of 6 atm. The polyethylene yield is 250 grams per gram of catalyst.

The molecular weight distribution of the polymer obtained is given by the value $$M_w^*/M_n^* = 15.9.$$

EXAMPLE 5

Polymerization with a chromium/molybdenum catalyst

In the same way as described in Example 4, ethylene is polymerized with the catalyst prepared in Example 2B, 25 vol. % hydrogen being present this time.

The polyethylene yield is 910 grams per gram of catalyst.

The molecular weight distribution is given by the value $$M_w^*/M_n^* = 12.8.$$

Comparative test with a known chromium catalyst

In the same manner as described in Example 4, ethylene is polymerized with a chromium catalyst prepared in a known manner by impregnation of a silica support with a Cr(acac)₃/TIBA complex.

The polyethylene yield is 1870 grams per gram of catalyst.

The molecular weight distribution is given by the value $$M_w^*/M_n^* = 20.0.$$

EXAMPLE 6

Polymerization with a chromium/titanium catalyst

Into a stirred autoclave (5 liters), 1.2 kg dry isobutane is introduced. After the contents of the reactor have been brought to a temperature of 98° C., ethylene is forced in to a total reactor pressure of 25 bar. Next, triethylboron (TEB) is added, so that the boron content in the polymerization medium is 2 ppm. Finally, 460 mg of the catalyst described in Example 3C is added. Polymerization is carried out for 60 minutes, during which the total pressure in the reactor is kept constant by forcing in ethylene. The temperature of the contents of the reaction vessel is maintained at 98° C. during the polymerization. The polyethylene yield is 1730 grams per gram of catalyst.

The molecular weight distribution is given by the value $$*M_w^*/M_n^* = 15.4.$$

Comparative test with a known chromium catalyst

In the same way as described in Example 6, ethylene is polymerized for 120 minutes at 102° C., at a total reactor pressure of 27 bar, with 550 mg of a chromium catalyst prepared in a known manner by impregnating a silica support with a Cr(acac)$_3$/TIBA complex. The polyethylene yield is 1610 grams per gram of catalyst.

The molecular weight distribution is given by the value $$*M_w/M_n* = 18.5.$$

Note that in the above formula defining the molecular weight distribution, $M_n*$ is the so-called number-average molecular weight defined as the total weight of all the molecules in a polymer sample divided by the total number of moles present. $M_w*$ is the so-called weight-average molecular weight. See "Principles of Polymerization," by Odian, pages 20–21 (McGraw-Hill, 1970).

What is claimed is:

1. Process of preparing a chromium-containing catalyst component, which upon activation with heat at a temperature of from 200° to 1200° C. will effect the polymerization of alpha-olefins, comprising depositing jointly or subsequently from solution onto an inert, particulate, inorganic support the following components:
   (a) a first component which is a chromium complex comprising the reaction product of:
      (1) a chromium compound, and
      (2) a group II or III element hydrocarbyl compound wherein the hydrocarbyl group contains 1–20 carbon atoms; and
   (b) at least one second component selected from the group consisting of
      (1) a transition metal complex which is the reaction product of:
         (a) a transition metal compound wherein the metal is selected from the group consisting of nickel, molybdenum, and titanium, and
         (b) a group II or III metal hydrocarbyl compound wherein the hydrocarbyl groups contain 1–20 carbon atoms, and
      (2) a transition metal alkoxide or carboxylic acid salt wherein the metal is selected from the group consisting of nickel, molybdenum, and titanium.

2. Process of claim 1, wherein said transition metal complex is formed by reacting from 0.5 to 20 moles of said group II or III element hydrocarbyl compound per mole of said transition metal compound.

3. Process of claim 1 wherein said chromium compound is selected from the group consisting of chromium-1, 3-diketo compounds, chromium salts of mineral acids, and chromium salts of carboxylic acids.

4. Process of any one of claims 1 or 3 wherein said transition metal compound is selected from the group consisting of transition metal-1, 3-diketo compounds, transition metal salts of mineral acids, and transition metal salts of carboxylic acids.

5. Process of claim 1 wherein said metal hydrocarbyl compound is selected from the group consisting of dialkyl compounds of group II elements and trialkyl compounds of group III elements.

6. Process of claim 1 wherein the atomic ratio of chromium to total quantity of transition metals is between 1:50 and 50:1.

7. Process of claim 1 comprising activating said catalyst component by heating in the range 200° C.–1200° C. in a non-reducing atmosphere.

* * * * *